UNITED STATES PATENT OFFICE.

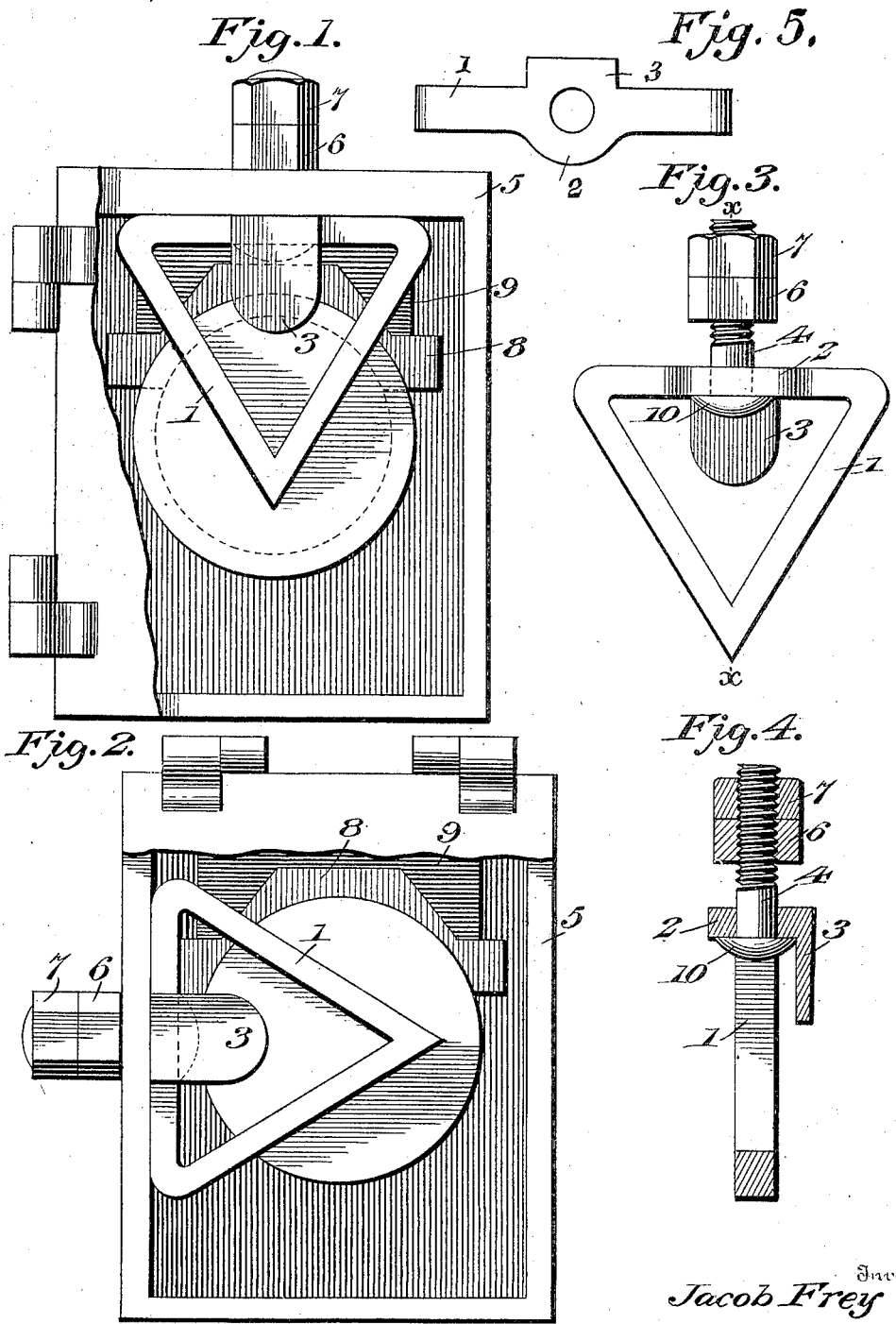

JACOB FREY, OF SPRINGFIELD, OHIO.

JOURNAL-BOX.

SPECIFICATION forming part of Letters Patent No. 688,842, dated December 17, 1901.

Application filed February 2, 1901. Serial No. 45,746. (No model.)

*To all whom it may concern:*

Be it known that I, JACOB FREY, a citizen of the United States, residing at Springfield, in the county of Clark and State of Ohio, have invented new and useful Improvements in Journal-Boxes, of which the following is a specification.

My invention relates to axle or journal boxes, and more especially to such boxes for use in connection with railway-cars; and the object of the invention is to provide a lock or guard for the bearings which is simple in construction, yet effective and durable.

Having thus stated the object of my invention, I will now proceed to describe the same in detail, also the best mode in which I have contemplated applying my invention to a journal-box, and then will particularly point out and distinctly claim the part, improvement, or combination which I claim as my invention.

In the accompanying drawings, illustrating my invention, in the several figures of which like parts are similarly designated, Figure 1 is an elevation of my device in position in a journal-box, the cover of said box being broken away. Fig. 2 is a similar view showing my device in a modified form of box. Fig. 3 is an elevation view of the preferred form of my invention. Fig. 4 is a vertical cross-section of my invention, taken in the plane of line $xx$, Fig. 3. Fig. 5 is a top view of the body.

This improved bearing-protector comprises in the preferred form thereof herein shown and described a suitable body 1 of any desired shape, (shown as triangular in the drawings,) having the central portion of its upper surface enlarged, as at 2, and having one of its outer edges bent downward to form a guard 3 for the head 10 of a bolt 4 to prevent any one from cutting the head of the bolt off. The bolt 4 passes through an opening in the enlarged portion of the body 1 and then through an opening in the journal-box 5 and is securely held in position by nuts 6 and 7. After the nuts have been screwed home I swage the upper end of the bolt, thus preventing the removal of my device from the journal-box. To make my device more effective, I provide the bolt 4 with a rounded head 10 and a swiveled support in the journal-box, so that when one attempts to loosen the nuts the bolt will turn or act as a swivel.

I have shown in Figs. 1 and 2 my device applied to a journal-box, and it is obvious that the bearings or brasses (designated by the numeral 8) and the wedge 9 are well protected against removal.

In the form of journal-box shown in Fig. 2 the bearing-protector is shown attached to the side thereof.

The operation in securing my invention in place is as follows: The bolt 4 is inserted through the enlarged portion of the triangular-shaped body-piece 1 and then through an aperture in the casing 5. Then the bolt is held by a wrench or the hand placed above the top of the journal-box and as far from the end of the bolt as is possible to hold the bolt so as to keep it from turning. A nut is then placed on the end of the bolt and screwed down to the wrench or hand, which is then removed and placed above the nut, which is then screwed down as far as possible, so as to bear upon the axle-box. It will readily be seen that after the first nut has been screwed home the bolt will be held tight enough for the screwing down of the nut 7, so that the operation necessary for tightening the nut in the first instance may be omitted in the case of the second one. After the nuts have been placed in position the end of the bolt is swaged.

To remove my device from the journal-box, the nuts 6 and 7 must be split.

I claim—

1. The combination, with a journal-box; of a bearing-protector comprising a skeleton body in the box having a central bolt-opening in the top thereof, and formed with an inwardly-projecting guard located in front of the body.

2. A bearing-protector for journal-boxes comprising a body of triangular shape having a central bolt-opening in the top thereof, and with an inwardly-projecting guard located in front of the body.

3. A bearing-protector for journal-boxes comprising a body of triangular shape, formed with an enlargement at the top having a central bolt-opening therein, and with an inwardly-projecting guard located in front of the body.

In testimony whereof I affix my signature in presence of two witnesses.

JACOB FREY.

Witnesses:
GEORGE W. TEHAN,
W. W. WITMEYER.